(12) United States Patent
MacEachern

(10) Patent No.: US 6,474,614 B2
(45) Date of Patent: Nov. 5, 2002

(54) HEAT DISSIPATING LAPTOP COMPUTER STAND WITH ADJUSTABLE TILT

(75) Inventor: James MacEachern, Rye, NH (US)

(73) Assignee: Road Tools LLC, Rye, NH (US)

( * ) Notice: Subject to any disclaimer, the term of this patent is extended or adjusted under 35 U.S.C. 154(b) by 0 days.

(21) Appl. No.: 09/883,979

(22) Filed: Jun. 20, 2001

(65) Prior Publication Data

US 2002/0003197 A1 Jan. 10, 2002

Related U.S. Application Data

(60) Provisional application No. 60/215,883, filed on Jul. 5, 2000.

(51) Int. Cl.[7] ........................... A47B 91/00; A47B 95/00
(52) U.S. Cl. ..................................... 248/349.1; 248/918
(58) Field of Search ........................ 248/346.01, 346.5, 248/349.1, 346.04, 346.05, 521, 918, 118.3, 188.2, 121; 211/163; 108/94, 103, 139

(56) References Cited

U.S. PATENT DOCUMENTS

| | | | | |
|---|---|---|---|---|
| 3,479,632 A | * | 11/1969 | Galles | 248/349.1 |
| 4,441,432 A | * | 4/1984 | Carlton | 108/5 |
| 4,648,574 A | * | 3/1987 | Granlund | 248/349.1 |
| 5,145,270 A | * | 9/1992 | Darden | 400/488 |
| 5,470,041 A | * | 11/1995 | Cucinotta | 248/349.1 |
| 5,657,956 A | * | 8/1997 | Smith et al. | 248/371 |
| 5,755,321 A | * | 5/1998 | Wang | 206/214 |
| 6,098,952 A | * | 8/2000 | Tonn | 248/688 |
| 6,113,050 A | * | 9/2000 | Rush | 248/346.01 |
| 6,349,657 B1 | * | 2/2002 | Wohlford | 108/94 |

FOREIGN PATENT DOCUMENTS

| | | | |
|---|---|---|---|
| JP | 10-125399 | * | 5/1998 |

* cited by examiner

Primary Examiner—Ramon O. Ramirez
Assistant Examiner—Gwendolyn Baxter
(74) Attorney, Agent, or Firm—Harrity & Snyder, L.L.P.

(57) ABSTRACT

A stand for supporting a laptop computer at different tilt angles may include a top plate with a trapezoidal shape including a number of riser clusters arranged along a narrower parallel side of the top plate. Each one of the riser clusters may be configured to fit within a riser element and hold the riser element. A bottom plate with a trapezoidal shape may be connected to the top plate by a connector that allows the top plate to rotate relative to the bottom plate. A number of laptop supports may be connected to a wider parallel side of the top plate and configured to support one end of the laptop in a slip-resistant manner. At least two riser elements may be stacked respectively on at least two riser clusters. At least two riser caps may be stacked respectively over the at least two riser elements to support an opposite end of the laptop in a slip-resistant manner and at an elevation higher than the one end of the laptop. A variable tilt angle may be imparted by adding or removing riser elements from the stacks to vary convective cooling of the laptop and keyboard tilt.

20 Claims, 10 Drawing Sheets

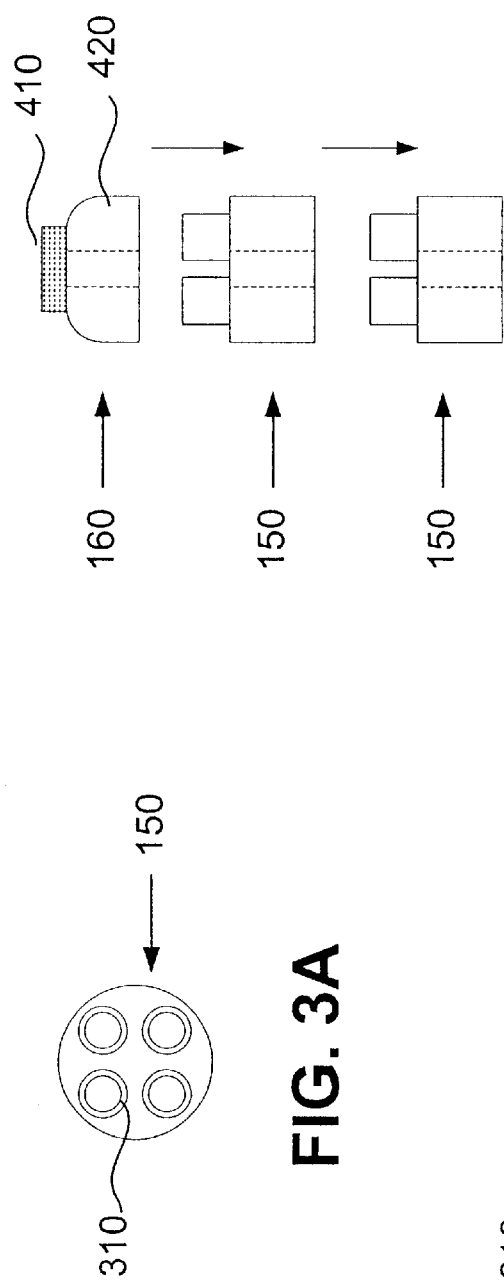
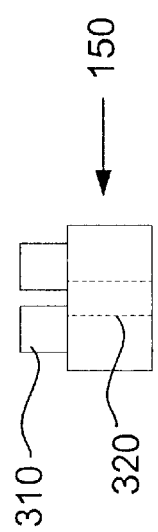
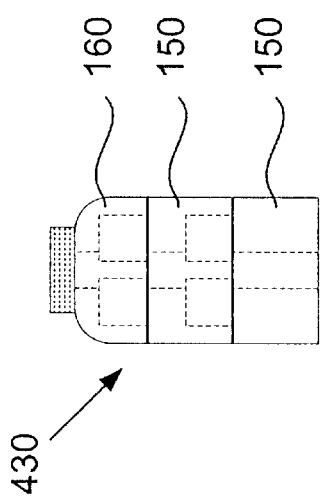
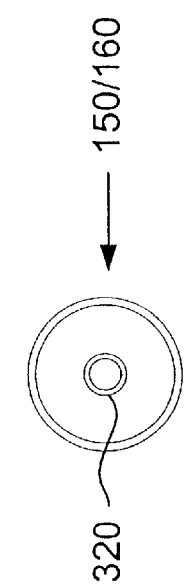
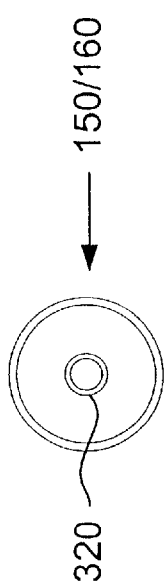

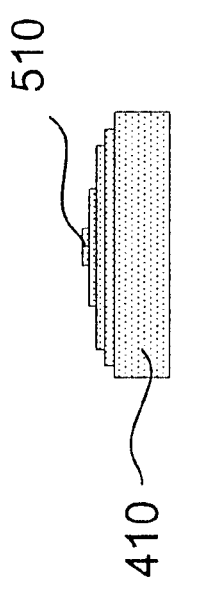
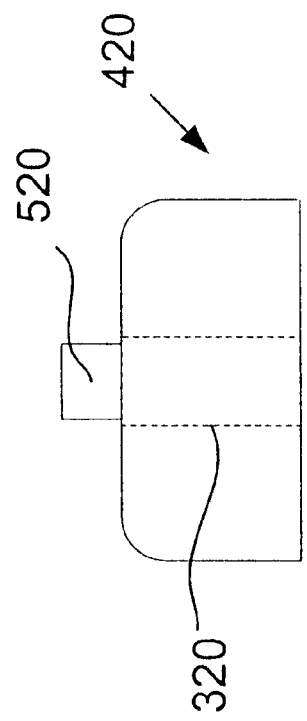
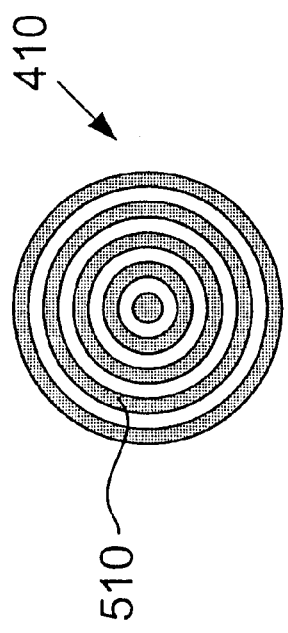
FIG. 5A
FIG. 5B
FIG. 5C

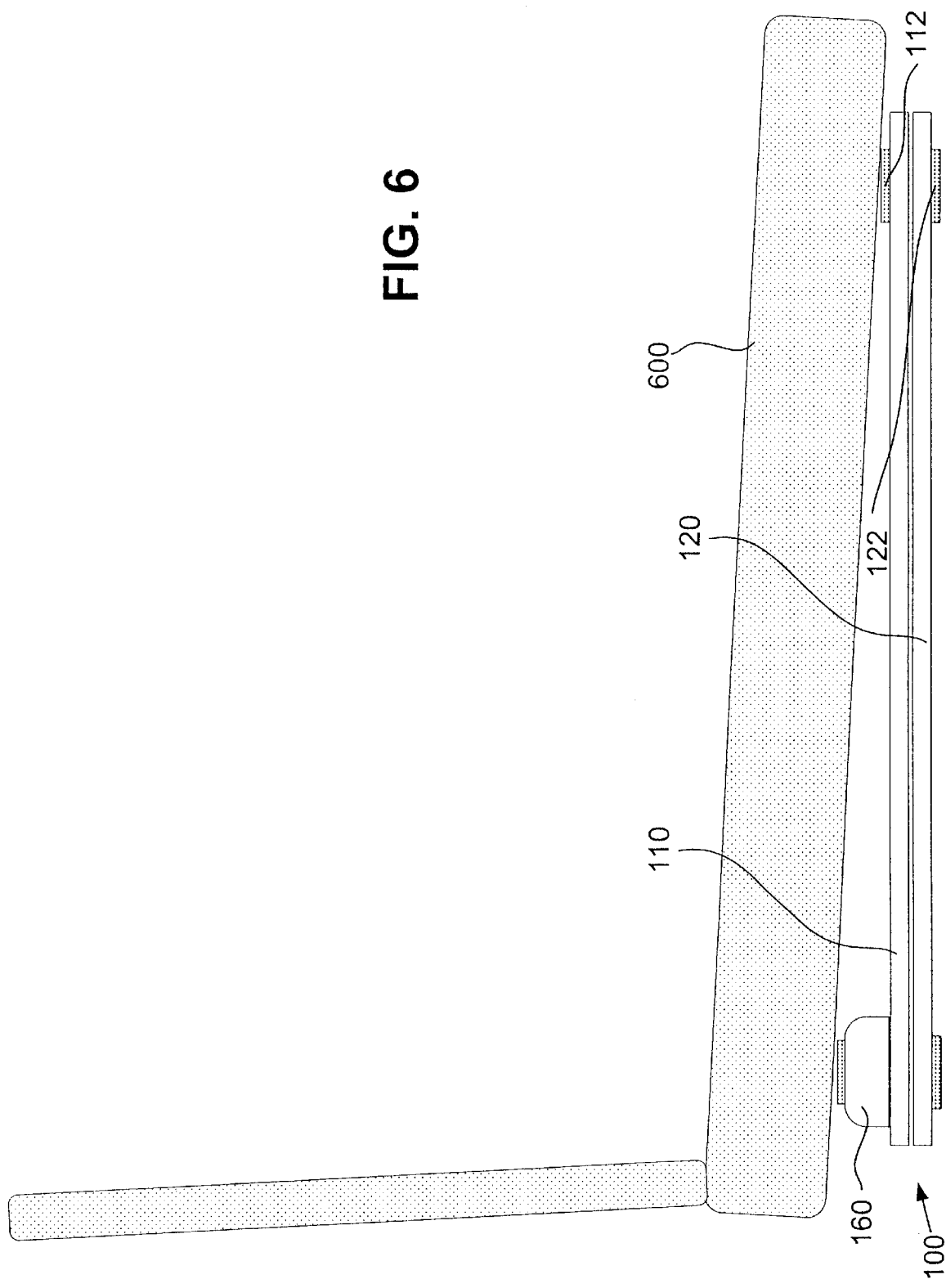

HEAT DISSIPATING LAPTOP COMPUTER STAND WITH ADJUSTABLE TILT

RELATED APPLICATION

This application claims the benefit of priority under 35 U.S.C. §119(e) of a provisional application, serial No. 60/215,883, filed Jul. 5, 2000, the entire contents of which are incorporated herein by reference.

BACKGROUND OF THE INVENTION

Field of the Invention

The present invention relates generally to stands for supporting electronic devices and, more particularly, to stands for supporting laptop computers.

Description of Related Art

Today, laptop (or "notebook") computers are increasingly used for mobile and desktop-based computing. As used herein. a "laptop computer" or "laptop" refers to a portable computer that is small enough to fit in a person'slap. Such laptop computers typically have a flat-panel display (e.g., LCD), and may be powered by a battery within the computer. A typical laptop computer may contain a similar processor to a desktop computer, but within a much smaller enclosure, and hence may need to dissipate considerable heat.

Typically, laptop computers dissipate heat through their bottom surfaces. Such computers may include small "feet" on their bottoms to provide an air gap for cooling beneath the laptop computer. However, when using a laptop on a bed or other soft surface, the air gap may not be present, and the laptop may overheat. Stands have been proposed that provide a surface on which to rest the laptop with an air gap underneath, but these stands typically maintain the laptop computer in a fixed, roughly horizontal position. Thus, such stands merely ensure that an air gap is present under the laptop when used on a lap or other soft surface.

In addition, such stands may not improve the cooling of laptop computers relative to the computers' built-in feet, even if they provide a larger air gap. Also, with varying laptop computer sizes (e.g., from sub-notebook computers to those having large (e.g., 14+ inch) screens) and shapes (e.g., flat or curved bottom surfaces), existing laptop stands may not be compatible with different laptop models. Further, stands that orient laptops in a fixed position may not address ergonomic considerations, such as a comfort relating to keyboard tilt.

As a result, there exists a need for laptop stands that facilitate the cooling of laptops, while accommodating a wide range of laptop models and addressing ergonomic considerations.

SUMMARY OF THE INVENTION

Apparatuses consistent with the present invention address this and other needs through a rotating stand with stackable risers that may accommodate several sizes and shapes of laptop computers. The height of the risers may be adjusted to produce a range of tilt angles that facilitate cooling and address ergonomic considerations.

In accordance with one purpose of the invention as embodied and broadly described herein, an apparatus for supporting a laptop computer may include a first planar member including a plurality of projections extending up from a first end of a top surface of the first planar member. A second planar member may be rotatably connected to the first planar member under the first planar member. A plurality of supporting elements may be attached to a second end of the top surface of the first planar member and configured to support a first side of the laptop computer a first height from the top surface of the first planar member, the second end of the top surface of the first planar member being opposite from the first end. A plurality of stackable members may be stacked on the plurality of projections and configured to support a second side of the laptop computer a second height from the top surface of the first planar member, the second height being greater than the first height and the second side of the laptop computer being opposite from the first side.

In accordance with another implementation consistent with the present invention, a stand for supporting an electronic device at different tilt angles may include a top plate including at least three riser projections arranged along one side of the top plate. Each one of the riser projections may be configured to fit within a riser member and hold the riser member. A bottom plate may be rotatably connected to the top plate, and at least two device supports may be connected to another side of the top plate and configured to support one end of the device in a slip-resistant manner. At least one variable-height riser member may be connected to each of two or more riser projections to support another end of the electronic device in a slip-resistant manner and higher than the one end of the electronic device. A variable tilt angle may be imparted between the electronic device and the top plate to enable convection cooling of the electronic device.

In accordance with still another implementation consistent with the present invention, a stand for supporting a laptop computer at different tilt angles may include a top plate with a trapezoidal shape including at least four riser clusters arranged along a narrower parallel side of the top plate. Each one of the riser clusters may be configured to fit within a riser element and hold the riser element by friction. A bottom plate with a trapezoidal shape may be connected to the top plate by a connector that allows the top plate to rotate relative to the bottom plate. At least four laptop supports may be connected to a wider parallel side of the top plate and configured to support one end of the laptop in a slip-resistant manner. At least two riser elements may be stacked respectively on at least two of the at least four riser clusters. At least two riser caps may be stacked respectively over each of the at least two riser elements to support an opposite end of the laptop in a slip-resistant manner and at an elevation higher than the one end of the laptop. A first tilt angle may be imparted between the laptop and the top plate to enable convection cooling of the laptop.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 3A–3C are top, side, and bottom views of a riser according to an implementation consistent with the present invention;

FIGS. 4A and 4B are exploded and connected side views of two risers and a riser cap according to an implementation consistent with the present invention;

FIGS. 5A–5C are top and side views of a supporting portion and a base portion of the cap according to an implementation consistent with the present invention;

FIGS. 6 and 7 are side views of a laptop with a positive keyboard tilt on a stand in accordance with an implementation consistent with the present invention;

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Apparatuses consistent with the present invention provide a rotating stand with stackable risers that may accommodate several sizes and shapes of laptop computers. The height of the risers may be adjusted to produce a range of tilt angles that facilitate cooling and address ergonomic considerations.

Exemplary Laptop Stand

Figure 1:
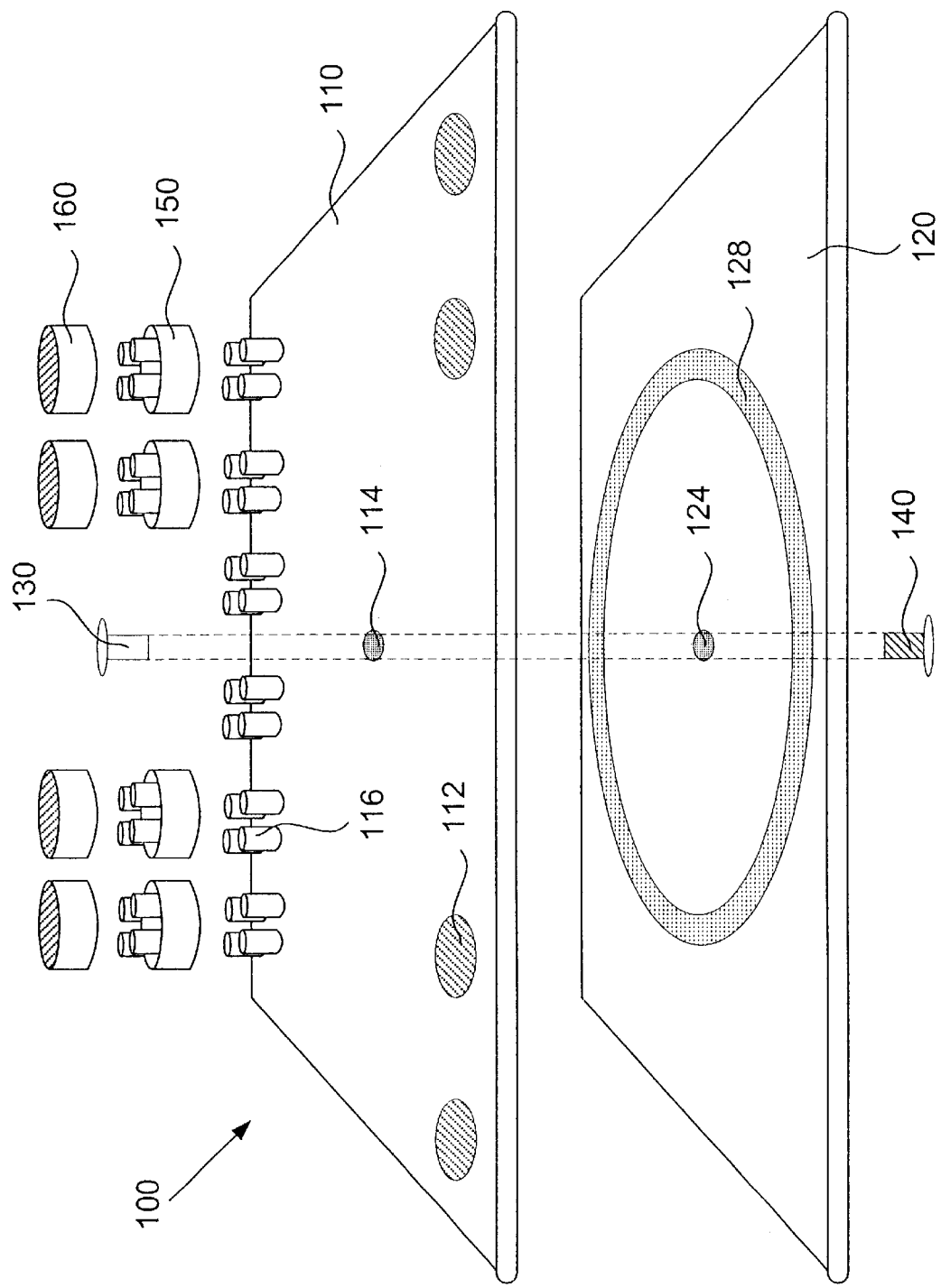
FIG. 1 is an exploded perspective view of an exemplary laptop stand consistent with the present invention.

FIG. 1 is an exploded perspective view of an exemplary rotatable laptop stand 100 consistent with the present invention. The stand 100 may include a top plate 110, a bottom plate 120, a binding post 130, a post screw 140, and at least one of a stackable riser 150 and a riser cap 160. The top plate 110 may be rotatably fastened to the bottom plate 120 by the binding post 130 and the post screw 140. The riser cap 160 and the stackable riser 150 may be removably attached to the top plate 110.

Figure 2A:
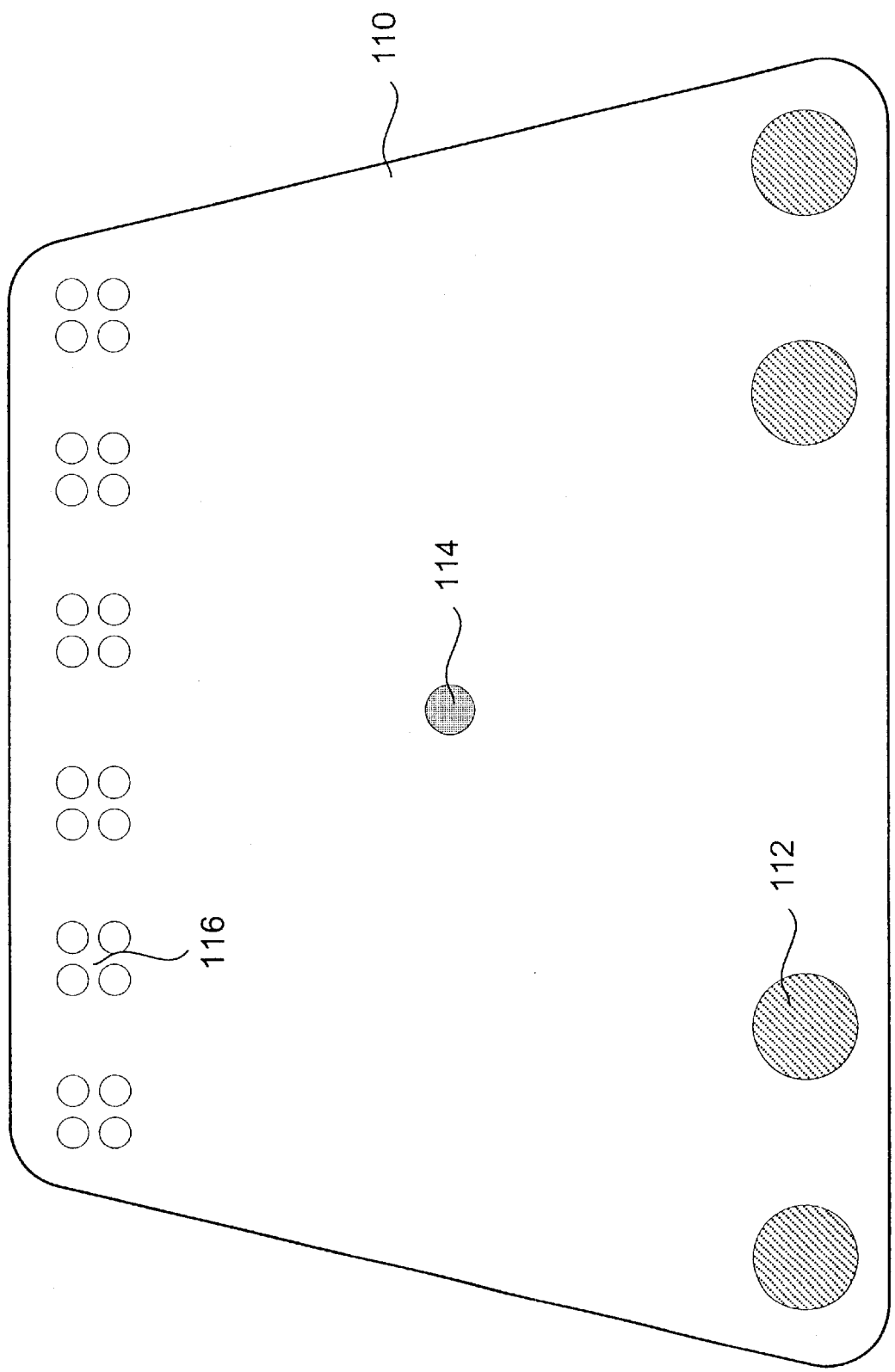
FIG. 2A is a top view of the stand in FIG. 1 in an implementation consistent with the present invention.

FIG. 2A is a top view of the top plate 110 in FIG. 1 in an implementation consistent with the present invention. The top plate 110 may include a through-hole 114 and a number of projections 116, and also may have a number of laptop supports 112 attached to its upper surface. The top plate may have a trapezoidal (i.e., a quadrilateral with two parallel sides) shape. The trapezoidal shape facilitates supporting both wide and narrow laptops. The longer of the two parallel sides, for example, may be used to support the front of a laptop, which is typically where users rest their wrists (causing an increased downward force). Hence, such a trapezoidal shape may provide a wider area of support for the typically heavier front portion of the laptop. Further, a trapezoidal shape for the top plate 110 allows less material to be used for a given maximum width, thereby decreasing the weight of the stand 100. Also the trapezoidal shape may further facilitate cooling of the laptop by an absence of material under portions of the laptop. For example, side and rear portions of a laptop may be exposed to more cooling air in the absence of the stand 100 beneath them. In one exemplary implementation, the longer parallel side measures 11 inches, and the shorter parallel side measures 8 inches. The distance between the parallel sides may be 8.75 inches, and the top plate 110 may have a thickness of about 0.3 inches.

The top plate 110 may be constructed of rigid material, such as a rigid plastic. One example of such a plastic is acrylonitrile butadiene styrene (ABS), which may be injection molded and is available from General Polymer of Westfield, Mass. However, the top plate 110 may be formed of any rigid material such as other plastics or polymers, wood, metal, various impregnated or laminated fibrous materials (e.g., fiberglass), and various plasticized materials. The top plate 110 may have a textured (e.g., haircell) finish on its top surface and a smooth finish on its bottom surface.

The through-hole 114 may extend roughly through the center of the top plate 110. The through-hole 114 in the top plate 110 (and a corresponding through-hole 124 in the bottom plate 120) allow for the insertion of a connector for the two plates. In one exemplary implementation, a 0.25 inch diameter through-hole 114 may be either molded into or cut through the center-point of the top plate 110.

The projections 116 may include clusters of four tube/column-shaped protrusions from the upper plate 110. As shown in FIGS. 1 and 2A, the upper plate 110 may include six cluster projections 116 spaced roughly equally along the shorter parallel side of the plate. The cluster projections 116 are configured to allow the stacking of stackable risers 150 and/or riser caps 160 thereon. In one exemplary implementation, the individual tube protrusions may have 0.3125 inch diameters and may extend 0.3125 inches from the surface of plate 110. The cluster projections 116 may be either injection molded along with the top plate 110 (i.e., formed in a unitary structure), or may be fixedly attached to the top plate 110 by adhesives, screws, etc.

In an exemplary implementation, at least two cluster projections 116 may be used in conjunction with the stackable risers 150 and/or riser caps 160 to elevate and support one side of the laptop. For example, the outermost two projections 116 may be used for support, while the other (interior) cluster projections 116 may be used to store any unused risers 150. Such an arrangement allows for stable, two-point support of one side (e.g., the rear) of a laptop having a curved bottom surface. In addition, interior risers 150 having a different total height may be used to support the middle of the curved bottom surface. Alternately, four or more cluster projections 116 may be used with risers 150 and/or riser caps 160 to provide a stable line of supports for a laptop having a flat bottom surface. Using more than two cluster projections 116 may facilitate supporting, for example, an ultra-thin laptop, while reducing bowing or flexing in the enclosure of such a thin laptop. Also, the use of more than two cluster projections 116 may provide more area contacting the laptop, and hence a more secure "grip" on the laptop than with, for example, only two cluster projections 116 supporting the laptop.

The laptop supports 112 located opposite the cluster projections 116 may be configured to support and "grip" another side (e.g., front) of a laptop. As illustrated in FIG. 2A, four laptop supports 112 may be attached to the top plate 110, although more or fewer may be used. The laptop supports 112 are preferably configured to have a relatively high coefficient of friction, thereby holding the laptop in a slip-resistant (e.g., non-skid) manner. The non-skid property of the laptop supports 112 may be achieved by choice of material for the supports and/or by texturing the top of the supports. In one exemplary implementation, the laptop supports 112 are fixedly attached to the top plate 110 by a high-tack, pressure sensitive adhesive coating on the underside of the laptop supports 112. The laptop supports 112 may measure approximately 0.75 inches wide and 0.16 inches high. The supports may be mounted about 0.25 inches from the shorter parallel side of the top plate 110. The supports 112 may be constructed of polyurethane having a high coefficient of friction, for example of the type available from Bumper Specialities of Mount Holly, N.J.

Figure 2B:
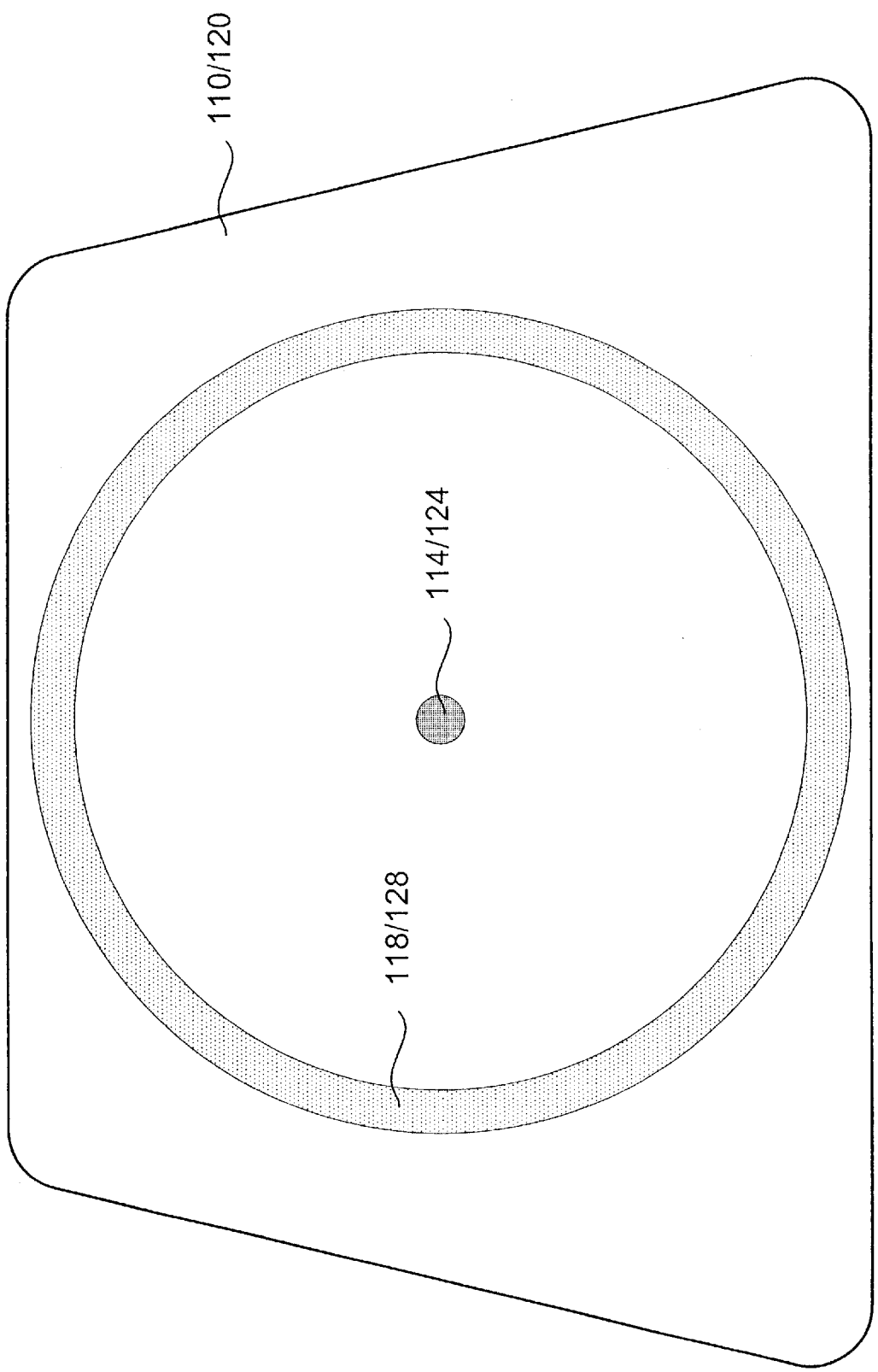
FIG. 2B is an interior view of either plate of the stand in FIG. 1 according to an implementation consistent with the present invention.

FIG. 2B is an interior view of either plate 110 or 120 of the stand 100 in FIG. 1 according to an implementation consistent with the present invention. That is, FIG. 2B is a bottom view of the top plate 110 and a top view of the bottom plate 120. In addition to a through-hole 114/124, the plate 110/120 may include a pivot track 118/128 that protrudes slightly from the remainder of its surface. The pivot track 118/128 may have a circular shape and a smooth surface. When the top plate 110 is joined to the bottom plate 120, the two pivot tracks 118 and 128 may define the area of contact between the two plates. Because the area of the pivot track 118/128 is smaller than, for example, the entire surface area of the trapezoidal plate 110/120, the stand 100 including the pivot tracks 118 and 128 will have a lower coefficient of friction and facilitate rotation of one plate relative to the other. Alternately, one of the pivot tracks 118/128 may be omitted, and the area of contact between the plates would still be defined by the area of the remaining pivot track. However, in this alternative implementation, the top and bottom plates 110 and 120 would tend to rub together more, thereby increasing the coefficient of friction.

In one exemplary implementation consistent with the present invention, the circular pivot track 118/128 projects about 0.014 inch from the otherwise smooth and flat surface of the plate 110/120. The pivot track 118/128 also may have a diameter of 8 inches and a width of 0.375 inch.

Figure 2C:
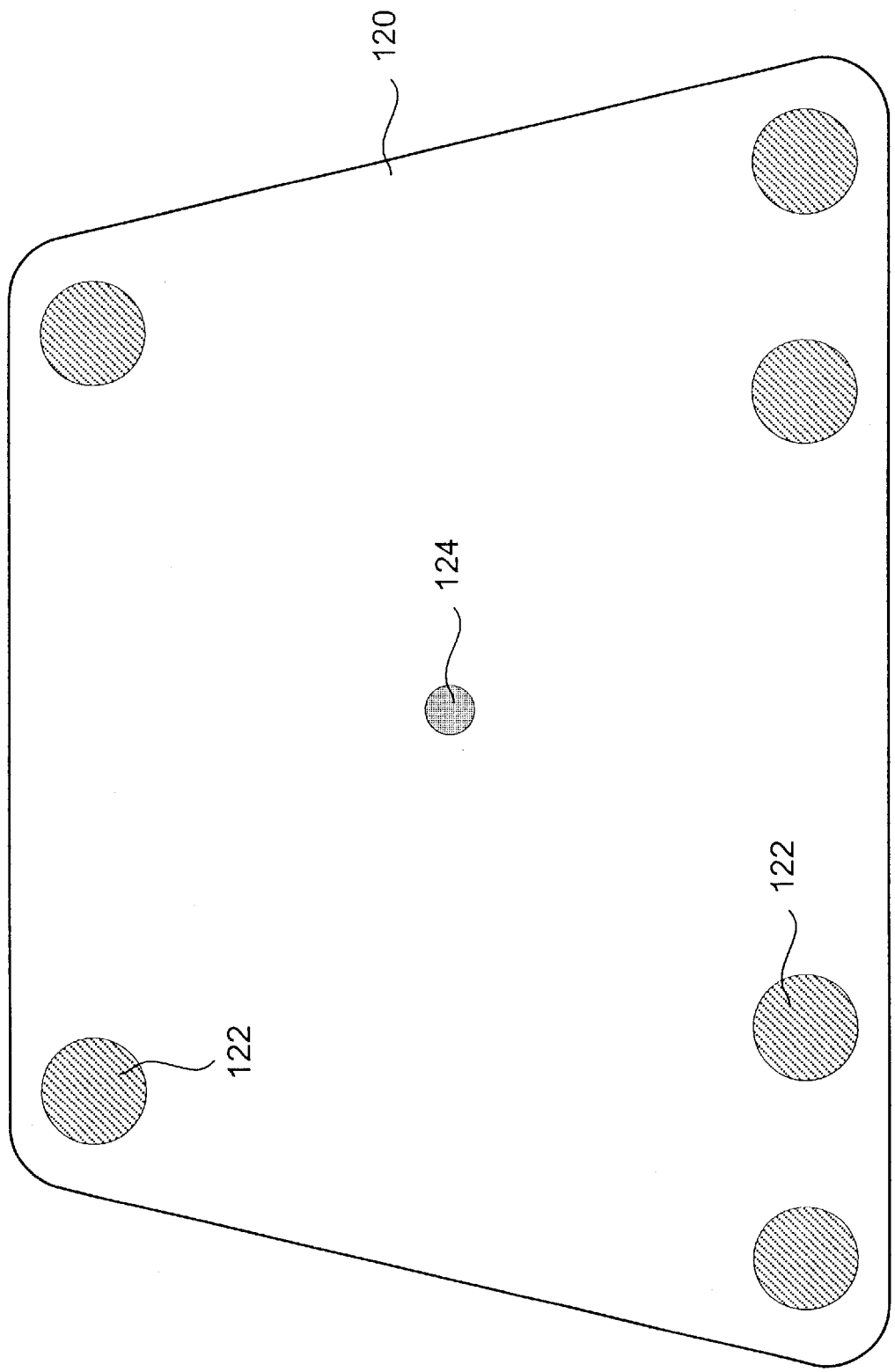
FIG. 2C is a bottom view of the stand in FIG. 1 in an implementation consistent with the present invention.

FIG. 2C is a bottom view of the bottom plate 120 in FIG. 1 in an implementation consistent with the present invention. The bottom plate 120 may include a through-hole 124 and may have a number of stand feet 122 attached to its lower surface. The shape, size, and construction of the bottom plate 120 and the through-hole 124 may be the same as those of the upper plate 110 and through-hole 114. Description of these elements will not be repeated.

The stand feet 122 may be located at every corner of the bottom plate 120. The feet 122 may be configured to support the stand 100 and "grip" the surface on which the stand rests in a slip-resistant (e.g., non-skid) manner. The stand feet 122 are preferably configured to have a relatively high coefficient of friction. As illustrated in FIG. 2C, additional stand feet 122 may be used to support the longer of the parallel sides of the bottom plate 120. In an exemplary implementation, stand feet 122 may be shaped, constructed, and attached to the bottom plate 120 in the same manner as the previously-described laptop supports 112. In such an implementation, the bottom plate 120 may differ from the top plate 110 only in the absence of the cluster projections 116. The top and bottom plates may share common manufacturing processes in such an instance to reduce costs.

Returning to FIG. 1, the binding post 130 is configured to receive and hold the post screw 140. Thus connected, the binding post 130 and post screw 140 define a connecting post extending through the top and bottom plates 110 and 120. Such a connecting post 130/140 holds the two plates adjacent to each other, while allowing rotation of the plates about the post. In one implementation consistent with the present invention, the binding post 130 has a cylindrical shaft of about 0.375 inch diameter, which is inserted into through-holes 114 and 124. The cylindrical shaft may be internally threaded. The post-screw 140 may include a threaded shaft of approximately 0.375 inch diameter, and may be screwed into the binding post 130 to connect the top and bottom plates 110/120. The heads of the binding post 130 and the post screw 140 may be larger than the diameter of the though holes 114/124. The binding post 130 and the screw 140 may be constructed of high-impact polystyrene and of the type available from Fastenall Inc. of Greenland, N.H. Alternately, one or more of the binding post 130 and post screw 140 may be constructed of metal for increased strength.

The stackable riser 150 and riser cap 160 shown in FIG. 1 will now be described in detail with reference to FIGS. 3A–5C. Because both the stackable risers 150 and riser caps 160 increase the effective height of the stand 100, they both may be generically referred to as "riser elements." FIGS. 3A–3C are top, side, and bottom views of the riser 150 according to an implementation consistent with the present invention. The riser 150 may include four tube/column-shaped protrusions 310 extending from its top surface, and a single cylinder 320 extending within a larger cylinder that defines the body of the riser. The location of the cylinder 320 within the riser 150 is illustrated by dashed lines in FIG. 3B.

The four protrusions 310 are spaced apart so that they may snugly (e.g., tightly and securely) receive and hold the cylinder 320 from another riser 150 or riser cap 160 among them. The protrusions 310 may be shaped and spaced the same as the four protrusions of the cluster projections 116. In this manner, a stackable riser 150 may be connected to (i.e., stacked on) either a cluster projection 116 or another stackable riser 150. As shown in FIG. 3C, the riser cap 160 may also contain an internal cylinder 310, enabling it to interlock with either a cluster projection 116 or a stackable riser 150.

FIGS. 4A and 4B are exploded and connected side views of two risers 150 and a riser cap 160 according to an implementation consistent with the present invention. The riser cap 160 may include a body portion 420 and a supporting portion 410 on the body portion. As shown in FIG. 4B, the risers 150 and riser cap 160 may be stacked to form a three-level riser 430. In an exemplary embodiment, the risers 150 and the riser cap 160 may each be about 0.5 inches high (excluding the protrusions 310 of the risers 150, which fit inside the element above). In the stackable manner shown in FIG. 4B, risers of, for example, 0.5 inches, 1.0 inches, and 1.5 inches total height may be obtained from one riser cap 160, one riser 150/one riser cap 160, and two risers 150/one riser cap, respectively. Other riser and riser cap heights may be used to provide varying increments of total riser height.

FIGS. 5A–5C are top and side views of the supporting portion 410 and the base portion 420 of the riser cap 160 according to an implementation consistent with the present invention. As may be seen in FIGS. 5A and 5C, the supporting portion 410 may include raised concentric cylinders 510 of material, between which there are concentric spaces. Alternatively, the supporting portion may include a spiral pattern of such material. FIG. 5C illustrates that the cylinders 510 may gradually increase in height toward the center of the supporting portion, resulting in a "rounded" top surface of the supporting portion 410. The base portion 420 may include a cylindrical protrusion 520 that may extend into a corresponding cavity (not shown) in the supporting portion 510 to connect the two portions.

The supporting portion 410 may be constructed of polyurethane or Santoprene™ (a thermoplastic elastomer) by, for example, injection molding. Alternately, the supporting portion may be constructed from ethylene propylene diene monomer (EPDM) material by, for example, compression molding. Such EPDM material tolerates heat better than, for example, Santoprene™ and may be continually exposed to temperatures greater than 300 degrees Fahrenheit without degrading. The EPDM material, for example, may have a durometer hardness of about 35 to 45 as measured by a "Shore A" scale durometer. As is known, the durometer hardness of a material is related to a penetration depth of a durometer probe into a sample of a material. Lower durometer materials typically provide better "grip" or static friction. The durometer hardness of the polyurethane or Santoprene™ materials, for example, may range from about 45 to 55 on the Shore A scale. The laptop supports 112 and the stand feet 122 may be constructed of a material having a similar durometer hardness. In addition to the durometer hardness of the supporting portion, its grip on a supported laptop is further improved by the cylinders 510, which may deform to provide a greater surface area against the laptop's bottom surface.

Figure 7:
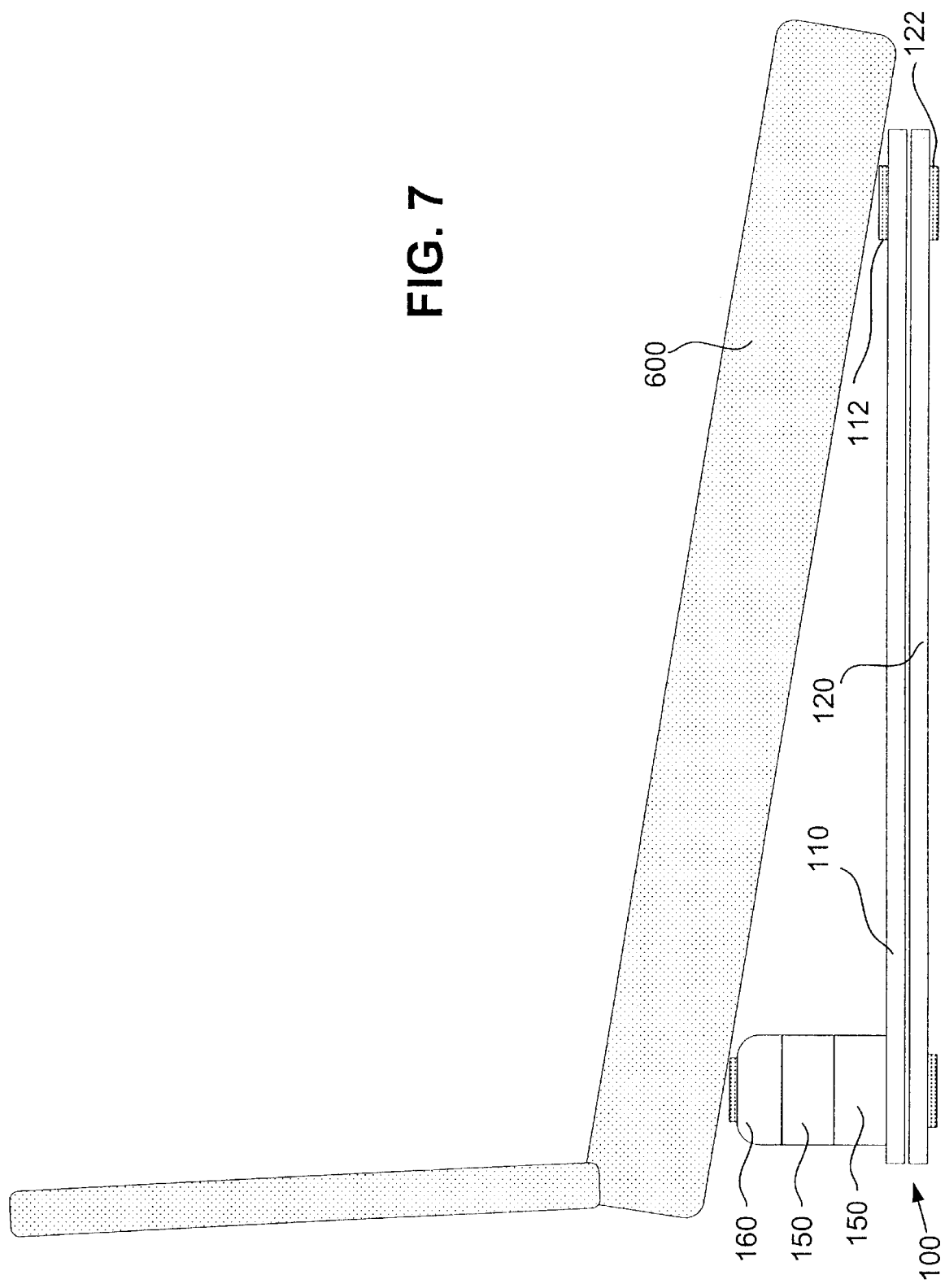

FIGS. 6 and 7 are side views of a laptop 600 (e.g., including a base portion containing a keyboard and a hinged flat panel display portion) with a positive keyboard tilt on a stand 100 in accordance with an implementation consistent with the present invention. The positive keyboard tilt may be defined as increasing keyboard height from the front of the keyboard (on the right side of FIGS. 6 and 7). In FIG. 6, the stand includes only a riser cap 160 to elevate the rear of the laptop computer 600, for example by about 0.5 inches relative to the front of the laptop. By contrast, in FIG. 7 the stand includes two risers 150 and a riser cap 160 to elevate the rear of the laptop computer 600, for example by about 1.5 inches relative to the front of the laptop. As may be seen in FIG. 7, the laptop 600 has a greater positive keyboard tilt.

A user may stack from zero to five or more risers 150 under the riser cap 160 to provide a keyboard tilt that is comfortable and easy to use based on the user's particular preference. For example, a greater keyboard tilt may raise the display portion of the laptop to a higher level, reducing neck strain for the user. Further, a positive tilt raises the rear of the laptop 600, allowing easier access to ports (e.g., video, sound, universal serial bus (USB), etc.) which may be located in the rear of the base portion of the laptop 600.

In addition, a greater tilt may also increase cooling of the laptop 600. As the bottom surface of the laptop 600 radiates heat, heated air rises and moves along the sloped bottom surface. This movement of heated air upward along the bottom slope of the laptop 600 cools the bottom surface by convection cooling. A greater tilt angle (e.g., in FIG. 7) may allow the heated air to rise more quickly than a lesser tilt angle (e.g., in FIG. 6), and hence, to flow more quickly along the bottom surface of the laptop 600. Thus, a greater tilt angle may allow greater convection cooling of the laptop 600.

Figure 8:
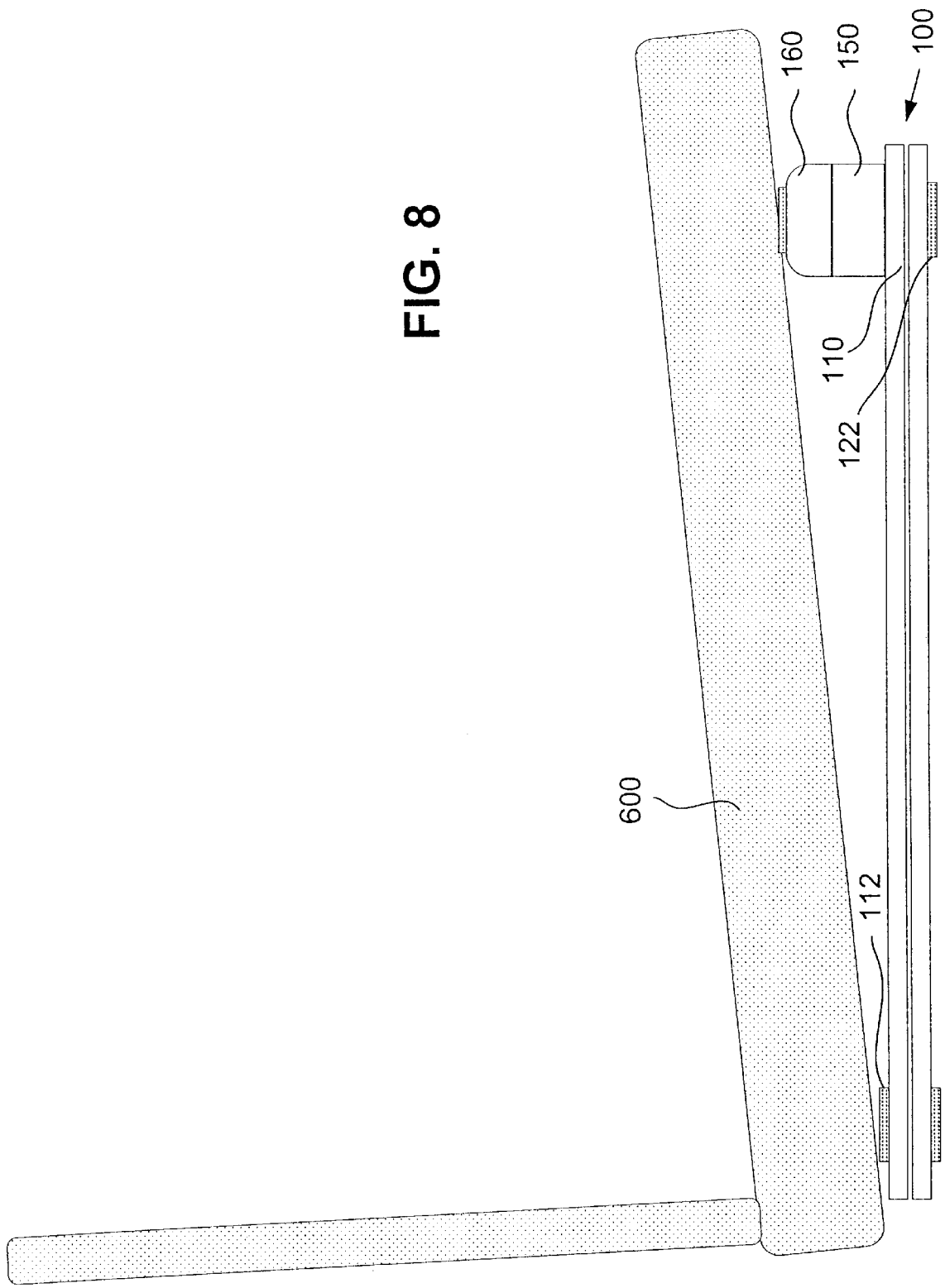
FIG. 8 is a side view of a laptop with a negative keyboard tilt on a stand in accordance with an implementation consistent with the present invention.

FIG. 8 is a side view of a laptop 600 with a negative keyboard tilt (i.e., sloping down from the front of the keyboard) on a stand 100 in accordance with an implementation consistent with the present invention. Rather than positioning the front of the laptop 600 on the laptop supports 112 and the rear of the laptop on the stackable risers/cap 150/160 as in FIGS. 6 and 7, the laptop may be positioned with its front raised higher than its rear by rotating the stand 100 (or its top plate 110) 180 degrees. In FIG. 8, one riser 150 and one riser cap 160 make up the supports located under the front of the laptop 600. It has been found that a negative keyboard tilt may be desirable. For example, the Cornell University Human Factors and Ergonomics Research Group suggests that a negative keyboard tilt improves wrist posture and reduces dynamic muscle loads. The adjustable stand 100 described herein provides a number of different negative keyboard tilts to address such ergonomic concerns.

Figure 9:
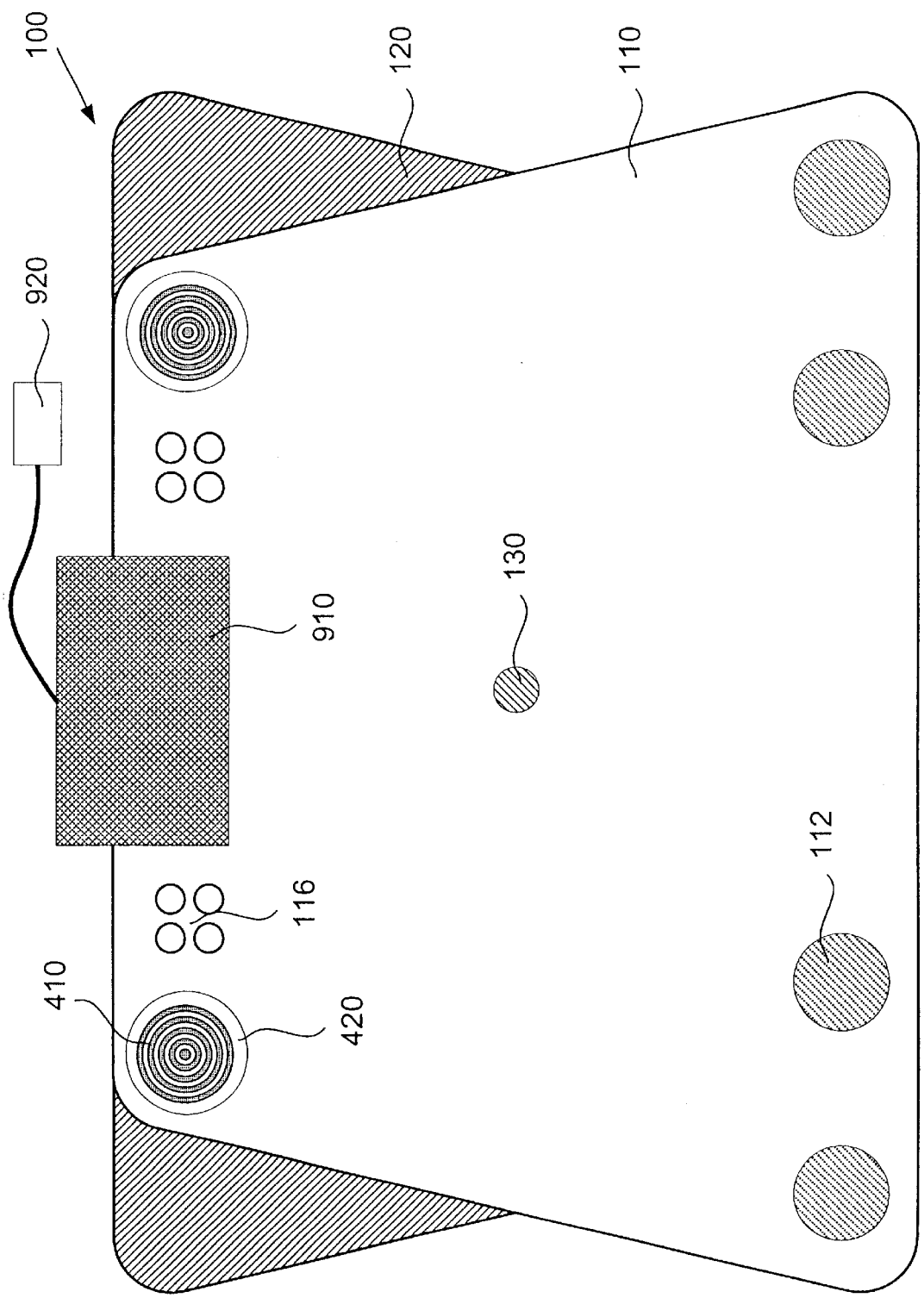
FIG. 9 is a top view of a partially rotated stand in accordance with an implementation consistent with the present invention.

FIG. 9 is a top view of a partially rotated, fully assembled stand 100 in accordance with an implementation consistent with the present invention. The top plate 110 is rotated 180 degrees with respect to the bottom plate 120. Such a configuration provides maximal surface area on the bottom of the stand when it is used, for example, in a user's lap or other location where the largest possible base is desired. As may be seen in FIG. 9, in the assembled stand 100 the top of the binding post 130 (or the post screw 140 if the two are reversed and the post screw is on top) is visible in the center of the stand. As may also be observed, two unused (i.e., with nothing stacked on them) cluster projections 116 are visible. The somewhat smaller diameter supporting portion 410 and the somewhat larger diameter base portion 420 of the riser cap 160 also are apparent from the top of the assembled stand.

The stand 100 may also include a cooling fan 910, which may be attached to one or more of the cluster projections 116. The cooling fan 910 may be configured to blow air toward, or away from, the center of the stand 100 to provide forced-air convection cooling of the bottom of the laptop 600. Forced-air convection cooling may remove more heat from the laptop than the tilted stand 100 alone, which causes passive convection cooling. The cooling fan may include a connector 920 connected to the cooling fan 910 by a bendable wire or cable. The connector may be configured to plug into, for example, a USB port (not shown) or other port (e.g., IEEE 1394 or Firewire™) that provides electrical power for peripherals on the side or rear of the laptop 600. The cooling fan 910 may be configured to run from, for example, 5V/500 mA provided by a typical USB port. The fan 910 may be shaped to fit within the height of a riser cap 160 (e.g., 0.5–1.0 inches), in which case it may fit under a laptop placed on the stand 100. Alternately, the fan 910 may be located beyond the stand 100, while being connected to the cluster projections by a piece that fits between the stand 100 and the laptop 600. In another alternate implementation, the fan may be located on the end of a stiff but bendable arm (not shown) that connects to, for example, one or more of the cluster projections 116. The arm may be bent and positioned to direct the air from the fan appropriately.

Modifications and variations are possible in light of the above teachings or may be acquired from practice of the invention. For example, in addition to the trapezoidal shapes described for plates 110 and 120, these plates may have different shapes (e.g., rectangular), and may be differently-sized than the exemplary dimensions above. Also, the binding post 130 and screw 140 may be replaced by any other conventionally known connector (e.g., a rivet) that would hold plates 110 and 120 together, while allowing them to rotate. Further, the number of risers used is not limited to any particular number. The implementation shown in the figures may accommodate up to six stacks of risers, and the number of risers within each stack may vary from one up to some number that produces a desirable tilt. However, in an alternative implementation, additional stacks of risers may be employed.

Other materials than those described may be used throughout the stand, including such (possibly later discovered) materials that are inexpensive to manufacture, strong and light. The laptop supports 112, the feet 122, and the riser elements 150/160 may have another cross-sectional shape than circular (e.g., hexagonal). Further, the stand 100 has been described mainly in the context of being used with a laptop computer. However, the stand 100 may be used with any other electronic device that it may be useful to tilt, rotate, and convectively cool (e.g., a portable DVD player, other devices with built-in displays, or display devices generally).

The foregoing description of preferred embodiments of the present invention provides illustration and description, but is not intended to be exhaustive or to limit the invention to the precise form disclosed. No element, act, or instruction used in the description of the present application should be construed as critical or essential to the invention unless explicitly described as such. As used herein, the article "a" is intended to include one or more items. Where only one item is intended, the term "one" or similar restrictive language is used. The scope of the invention is defined by the claims and their equivalents.

What is claimed is:

1. An apparatus for supporting a laptop computer, comprising:
    a first planar member including:
        a plurality of projections extending up from a first end of a top surface of the first planar member;
    a second planar member under the first planar member and rotatably connected to the first planar member;
    a plurality of supporting elements attached to a second end of the top surface of the first planar member and configured to support a first side of the laptop computer a first height from the top surface of the first planar member, the second end of the top surface of the first planar member being opposite from the first end; and
    a plurality of stackable members stacked on the plurality of projections and configured to support a second side of the laptop computer a second height from the top surface of the first planar member, the second height being greater than the first height and the second side of the laptop computer being opposite from the first side.

2. The apparatus of claim 1, wherein the first end of the first planar member is parallel to and shorter than the second end of the first planar member.

3. The apparatus of claim 1, wherein at least one of the first planar member and the second planar member includes:
    a raised pivot track with a circular shape on a surface of the at least one planar member contacting the other planar member, the pivot track being configured to reduce friction between the first and second planar members.

4. The apparatus of claim 1, wherein top surfaces of at least one of the supporting elements and the stackable members are textured to support the laptop computer in a slip-resistant manner.

5. The apparatus of claim 4, wherein materials of the top surfaces of the supporting elements and the stackable members range in durometer hardness from about 35 to about 55 on a Shore A durometer scale.

6. The apparatus of claim 1, wherein each of the plurality of stackable members includes:
    a riser cap having a textured and sloping top surface to support the laptop computer in a slip-resistant manner.

7. The apparatus of claim 6, wherein each of the plurality of stackable members includes:
    at least one riser member between one of the plurality of projections and the riser cap, the at least one riser member including a riser projection for stacking the riser cap or another riser member thereon.

8. The apparatus of claim 1, wherein each of the plurality of projections includes:
    a group of four protrusions spaced to receive and hold a connecting member in a center of the four protrusions.

9. A stand for supporting an electronic device at different tilt angles, comprising:
    a top plate including:
        at least three riser projections arranged along one side of the top plate, each one of the riser projections being configured to fit within a riser member and hold the riser member;
    a bottom plate rotatably connected to the top plate;
    at least two device supports connected to another side of the top plate and configured to support one end of the electronic device in a slip-resistant manner; and
    at least two variable-height riser members, at least one riser member being connected to each of two or more riser projections to support another end of the electronic device in a slip-resistant manner and at a higher elevation than the one end of the electronic device, thereby imparting a tilt angle between the electronic device and the top plate to enable convection cooling of the electronic device.

10. The stand of claim 9, wherein the top plate and the bottom plate have a trapezoidal shape including longer and shorter parallel sides, and
    wherein the at least three riser projections are arranged along the shorter parallel side and the at least two device supports are connected to the longer parallel side of the top plate.

11. The stand of claim 9, wherein each of the top and bottom plates includes:
    a raised pivot track with a circular shape on an interior surface of the plate, the pivot tracks being configured to reduce sliding friction between the top and bottom plates.

12. The stand of claim 9, wherein each of the at least two riser members includes:
    a riser cap including a plurality of concentric cylinders with spaces in between, the concentric cylinders increasing in height with decreasing cylinder radius to support the device in a slip-resistant manner.

13. The stand of claim 12, wherein each of the at least two riser members includes:
    a spacer element located between one of the riser projections and the riser cap, the spacer element including a riser projection for stacking the riser cap or another spacer element thereon.

14. The stand of claim 13, wherein the addition of spacer elements between the riser projections and the riser cap increases the tilt angle of the electronic device.

15. The stand of claim 9, wherein each of the at least two riser members includes:
    a riser cap including material having a durometer hardness ranging from about 35 to about 45 on a Shore A durometer scale.

16. The stand of claim 9, wherein the bottom plate includes:
    at least four feet configured to support the stand in a slip-resistant manner on a surface that the stand rests upon.

17. The stand of claim 9, further comprising:
    an electric fan connected to at least one of the riser projections and configured to receive power from the electronic device and to provide forced convection cooling of the electronic device.

18. A stand for supporting a laptop computer at different tilt angles, comprising:
    a top plate with a trapezoidal shape including:
        at least four riser clusters arranged along a narrower parallel side of the top plate, each one of the riser clusters being configured to fit within a riser element and hold the riser element by friction;

a bottom plate with a trapezoidal shape connected to the top plate by a connector that allows the top plate to rotate relative to the bottom plate;

at least four laptop supports connected to a wider parallel side of the top plate and configured to support one end of the laptop in a slip-resistant manner; and at least two riser elements respectively stacked on at least two of the at least four riser clusters; and at least two riser caps respectively stacked over each of the at least two riser elements to support an opposite end of the laptop in a slip-resistant manner and at an elevation higher than the one end of the laptop, thereby imparting a first tilt angle between the laptop and the top plate to enable convection cooling of the laptop.

19. The stand of claim 18, further comprising:

at least two other riser elements respectively stacked between each of the at least two riser elements and the at least two riser caps, thereby imparting a second tilt angle between the laptop and the top plate that is greater than the first tilt angle.

20. The stand of claim 18, wherein each of the riser clusters includes four cylindrical protrusions spaced to define a central area for holding a riser element.

* * * * *